Nov. 29, 1960   M. I. PERRY   2,961,779
EDUCATIONAL MANIPULATIVE DEVICE AND METHOD OF TEACHING
Filed July 30, 1959

INVENTOR.
MARY I. PERRY
BY *Pyle & Fisher*
ATTORNEYS

United States Patent Office 2,961,779
Patented Nov. 29, 1960

2,961,779
EDUCATIONAL MANIPULATIVE DEVICE AND
METHOD OF TEACHING
Mary I. Perry, 354 Front St., Berea, Ohio
Filed July 30, 1959, Ser. No. 830,519
3 Claims. (Cl. 35—73)

This invention relates to educational devices and has particular value for educating and entertaining children of early school age.

In actual use, it has been found that the invention has value for chemistry students to demonstrate molecular structures.

Many grade schools now teach young children the value of monetary coins, and how to make and count change. In teaching a child the value of monetary coins, visual demonstration and practice is almost an essential. This need for visual demonstration and practice has in the past created some difficulty. Further, simple mathematics and teaching of line designs have required makeshift aids—usually something gathered together by the teacher.

If each child is furnished with sample coins for the purpose of participating in an educational lesson, a large number of coins are required. Children of kindergarten and first grade ages are apt to lose some of the money. They are also apt to put coins in their mouths and then choke on a coin or swallow it. Further, they drop coins on the floor causing noisy classroom disruptions. Obtaining such a quantity of coins is also a time-consuming problem to the teaching and few teachers are favorably disposed toward the alternative which would be to maintain a supply of such coins. The result is that teachers normally use a small number of coins with demonstrations at one part of the room. This results in a reduced efficiency in teaching the children.

Under the present invention, a plurality of novel disks are employed. They are preferably shaped to approximate the size of monetary coins. The disks are also preferably in different colors and may be of sizes to permit ready grouping of the disks. Each group then represents a monetary coin of a value different from the coins of the other groups.

In addition to the attractiveness and ability to hold attention because of the coloring of the disks, the child's attention is further drawn to the project by their novelty and amusement value to him. This is achieved by providing an interlock means on each of the disks so that they may be made into chains or other fanciful patterns.

The invention contemplates the provision of a disk which is safe and cannot in any way harm the child. A breathing aperture is formed through the center of each of the disks to prevent choking, in the event that one should lodge in the throat of a child.

Accordingly, one of the principal objects of the invention is to provide a novel and improved device for teaching the value of monetary coins.

A related object of this invention is to provide a plurality of disks which are readily segregated into groups to synthesize groups of coins of different values.

Another object of this invention is to provide a novel and improved disk-like educational device in which the disks are readily connectable into chains or other geometric patterns.

An additional object of this invention is to provide an educational device which is also an amusement device.

A further and more specialized object of this invention is to provide a novel and improved monetary educational device in which each of a plurality of disks has a breathing aperture formed through the middle to eliminate any possibility of a child's choking on a disk.

To summarize, this overall object sought to be accomplished is to provide the teacher with an effective tool which the student can manipulate and thus better visualize the problem and its teaching. For example only, disk devices made according to this invention are being used to teach addition, subtraction, and simple multiplication as well as line design and geometric patterns. Further, they are quite useful just as play items, although excessive use as play items is discouraged in order to preserve their novelty for teaching. Some use has also been made in the representation of chemical molecular structures.

Other objects and a fuller understanding of the invention may be had by referring to the following description and claims, taken in conjunction with the accompanying drawing, in which:

Figure 1:
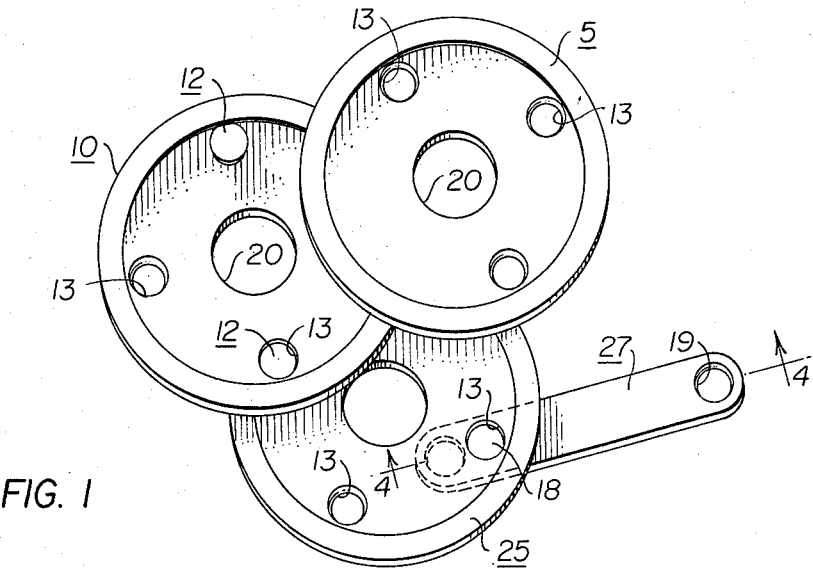
Figure 1 is a perspective view of a group of the disks and showing a connecting link bar used for special purposes.

Referring to the drawings, a plurality of disk-like wafers are shown and designated by the numerals 5, 10, and 25. The disks or wafers designated by the numeral 10 are of one color which may, for example, represent a ten-cent piece. A different colored disk 5 may designate a five-cent piece, and another colored disk 25, a twenty-five cent piece. Color is arbitrary, and hence the drawing is not lined for color.

Any color combination which permits ready discernment will, of course, be suitable. The disks are each preferably made out of a yieldable plastic and safe coloring may be achieved by forming them from a colored plastic. Colored polyethylene is an excellent material for this purpose because of its yieldability, stability, and chemical inertness. Such disks are easily cleansed to keep them sanitary. They are also quite durable and very suitable for the purpose.

Each disk is equipped with a locking projection 12. The locking projection 12 projects outwardly from one face of the disk near the periphery of the disk. As shown, the locking projection has an axis which is essentially parallel to the axis of the disk.

Figure 2:
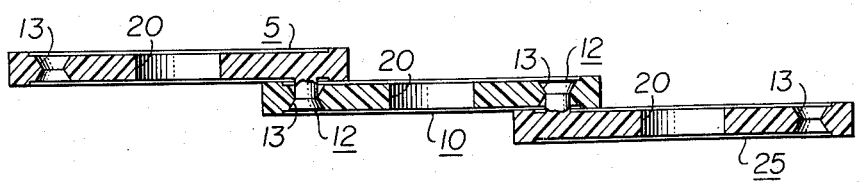
Figure 2 is a sectional view of a plurality of disks linked together to form a chain.
Figure 3:
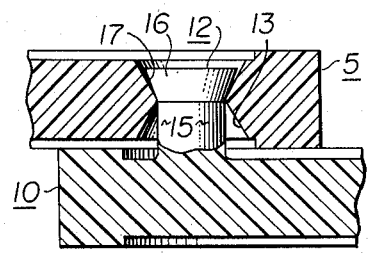
Figure 3 is an enlarged section through the attachment means of two of the links for the purpose of more accurate illustration; and, Figure 4 is a section of a connecting bar taken along line 4—4 of Figure 1.

Each disk has at least one projection receiving aperture 13. The projection receiving apertures are also generally parallel to the axis of the disk and disposed near the periphery of the disk. In each disk, one of these apertures is disposed in the same plane of cross section as the projection 12, as will be appreciated by examination of Figure 2. The Figure 1 illustrates the projections 12 of other disks in apertures 13 of the disks. In the preferred and disclosed arrangement, two other apertures are provided 90 degrees from the projection 12— also near the periphery of the disk. Although these three apertures are sufficient for most purposes, any number may be provided for additional convenience.

In the preferred and disclosed arrangement, each of the projections 12 includes a stem portion 15 and an enlarged head portion 16. The apertures or bores 13 each preferably include a counterbore portion 17. When locking the disks together, one presses two of them together, with the projection 12 in axial alignment with an aperture 13 on the other disk. A projection 12 is forced through the aperture 13 until the head portion 16 is disposed in the counterbore 17. This locks the two disks together in a readily disconnectable fashion. It will be seen that it is important that the disks be of a sufficiently deformable and yieldable plastic to permit repeated interlocking.

Figure 4:
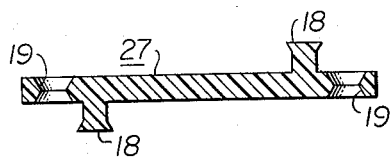

Although conceived as an education device for young children, this invention has been found to provide an exceptionally useful tool for scientists and advanced students. For example, by use of an auxiliary bar 27, having end apertures 19 and projection stems 18, preferably arranged as shown in Figure 4, chemical and physical symbols may be constructed.

A port 20 is formed in the disk. Preferably, as shown, the port 20 extends through the center of the disk so that it is coaxial with the disk. The purpose of the port is primarily one of safety. In the event that a child places one of these disks in his mouth and the disk then becomes lodged in his throat, he will not suffocate. The through port 20 permits sufficient air to pass through it to prevent suffocation until aid can be given the child. As will be apparent, the port 20 also has the attended advantage of reducing the weight and the cost of the device.

Another of the advantages of this invention is that for the first time an educational aid is provided for teaching the value of money, which aid can be purchased at school for that purpose. It is now possible for a school to maintain a stock of such provisions for use in teaching. Heretofore, such aids have not been available and schools have resorted to the use of bottle caps or other substitutes for actual money.

With this novel and improved arrangement each child can be furnished a supply of, for example, synthetic pennies, nickels, dimes, quarters and half-dollars. After a few rudimentary instructions, a barter-like game can be instigated wherein children trade coins for coins of another. The children can also play store purchasing items of imaginary value and practicing the art of making change.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An educational device for use as an aid in teaching the value of monetary coins comprising, a plurality of circular disk-like plastic wafers, each of said wafers having a through, axially disposed, breathing port, each of said wafers having a connecting projection extending outwardly from one face thereof, each of said wafers also having a connecting aperture formed transversely therethrough, said connecting projection and said connecting aperture of each such wafer being disposed in a common plane of cross section and substantially equidistant from the axis of the device, each of said projections being removably receivable in the connecting apertures in each of the other wafers, each of said projections having a deformable lip at the outer end thereof, each of said lips being a disconnectable interlock when one of the projections is disposed in an aperture to connect two wafers together, said wafers being formed into a chain when said projections are connected to adjacent wafers, said wafers being made of varying colors to permit classifications into groups through color identification, and the wafers of each such group simulating coins of one selected value.

2. The device of claim 1 wherein each of said wafers has at least two such connecting apertures and wherein such apertures are 90 degrees from one another.

3. An educational device, comprising, a plurality of disc-like wafers each of said wafers having a through, axially disposed, breathing port, each of said wafers having a connecting projection extending outwardly from one face thereof, each of said wafers also having a connecting aperture formed transversely therethrough, said connecting projection and said connecting aperture of each said wafer being disposed in a common plane of cross section and substantially equidistant from the axis of the device, each of said projections being removably receivable in the connecting apertures in each of the other wafers, each of said projections having a deformable lip at the outer end thereof, each of said lips being a disconnectable interlock when one of the projections is disposed in an aperture to connect two wafers together.

References Cited in the file of this patent

UNITED STATES PATENTS

| | | |
|---|---|---|
| 705,833 | Gee | July 29, 1902 |
| 1,043,652 | Whitman | Nov. 5, 1912 |
| 2,119,921 | Levy | June 7, 1938 |
| 2,446,120 | Wiswesser | July 27, 1948 |
| 2,506,001 | Sturman | May 2, 1950 |
| 2,540,369 | Hume | Feb. 6, 1951 |
| 2,649,803 | Andre | Aug. 25, 1953 |
| 2,714,269 | Charles | Aug. 2, 1955 |